(12) United States Patent
Ogino et al.

(10) Patent No.: US 8,768,103 B2
(45) Date of Patent: Jul. 1, 2014

(54) VIDEO PROCESSING APPARATUS AND VIDEO DISPLAY APPARATUS

(75) Inventors: Masahiro Ogino, Ebina (JP); Mitsuo Nakajima, Yokohama (JP); Yoshiaki Mizuhashi, Yokohama (JP); Kenta Takanohashi, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1563 days.

(21) Appl. No.: 12/050,972

(22) Filed: Mar. 19, 2008

(65) Prior Publication Data

US 2008/0231745 A1  Sep. 25, 2008

(30) Foreign Application Priority Data

Mar. 19, 2007  (JP) ................. 2007-069758

(51) Int. Cl.
*G06K 9/32* (2006.01)
*G06K 9/00* (2006.01)
*H04N 7/01* (2006.01)
*H04N 7/00* (2011.01)
*H04N 9/64* (2006.01)

(52) U.S. Cl.
USPC ........... 382/300; 382/168; 382/169; 382/170; 382/171; 382/172; 348/441; 348/474; 348/699

(58) Field of Classification Search
USPC ........... 348/441, 474, 699; 382/168–172, 300
See application file for complete search history.

(56) References Cited

U.S. PATENT DOCUMENTS

| | | | |
|---|---|---|---|
| 6,509,930 B1 | 1/2003 | Hirano et al. | |
| 2003/0086498 A1* | 5/2003 | Lee et al. | 375/240.16 |
| 2004/0101058 A1* | 5/2004 | Sasai et al. | 375/240.26 |
| 2005/0078212 A1 | 4/2005 | Ha | |
| 2005/0184949 A1 | 8/2005 | Kamimura | |
| 2005/0231644 A1 | 10/2005 | Salzer et al. | |
| 2005/0232357 A1 | 10/2005 | Hubrich et al. | |
| 2007/0133685 A1* | 6/2007 | Seong et al. | 375/240.16 |
| 2007/0140347 A1* | 6/2007 | Moon et al. | 375/240.16 |
| 2007/0242748 A1* | 10/2007 | Mahadevan et al. | 375/240.14 |
| 2008/0025390 A1* | 1/2008 | Shi et al. | 375/240.02 |

FOREIGN PATENT DOCUMENTS

| | | |
|---|---|---|
| CN | 1661429 | 8/2005 |
| CN | 1270526 | 8/2006 |
| JP | 11-331782 | 11/1999 |
| JP | 2000-333134 | 11/2000 |

(Continued)

OTHER PUBLICATIONS

Toshiba Review, vol. 59, No. 12, (2004).

(Continued)

*Primary Examiner* — Nasser Goodarzi
*Assistant Examiner* — Kyu Chae
(74) *Attorney, Agent, or Firm* — Antonelli, Terry, Stout & Kraus, LLP.

(57) ABSTRACT

There is provided a video processing apparatus comprising a motion vector detection unit for detecting data on the motions of objects by using at least two frames, an interpolation frame generation unit for generating interpolation frames in the horizontal/vertical and temporal directions in accordance with the motion vectors obtained by the motion vector detection unit, and an image feature detection unit for detecting the features of motions extended over the at least two frames, wherein the procedures, performed by the image feature detection unit, of generating interpolation frames in the horizontal/vertical and temporal directions are switched over in accordance with the features of motions.

6 Claims, 13 Drawing Sheets

(56) References Cited

FOREIGN PATENT DOCUMENTS

| | | |
|---|---|---|
| JP | 2001-54075 | 2/2001 |
| JP | 2002-027414 | 1/2002 |
| JP | 2004-180242 | 6/2004 |
| JP | 3588564 | 8/2004 |
| JP | 2005-6275 | 1/2005 |
| JP | 2005-124201 | 5/2005 |
| JP | 2005-287048 | 10/2005 |
| JP | 2005-287049 | 10/2005 |
| JP | 2006-270823 | 10/2006 |
| JP | 2006-279917 | 10/2006 |

OTHER PUBLICATIONS

Toshiba review, vol. 59, No. 12 (2004).

* cited by examiner

|   | -5 | -4 | -3 | -2 | -1 | 0 | 1 | 2 | 3 | 4 | 5 |
|---|----|----|----|----|----|---|---|---|---|---|---|
| -2 | 1 | 58 | 455 | 985 | 5653 | 546 | 20896 | 522 | 652 | 25 | 44 |
| -1 | 8 | 96 | 21 | 255 | 5403 | 21249 | 47440 | 8466 | 2836 | 74 | 51 |
| 0 | 83 | 65 | 55 | 451 | 10254 | 55058 | 18496 | 22944 | 1485 | 99 | 24 |
| 1 | 595 | 4 | 968 | 2657 | 8793 | 27074 | 31488 | 10647 | 54 | 45 | 66 |
| 2 | 65 | 55 | 258 | 24 | 4556 | 5456 | 25230 | 599 | 889 | 999 | 58 |

| | DEGREE OF VECTOR CONCENTRATION | | |
|---|---|---|---|
| | HIGH | INTERMEDIATE | LOW |
| NUMBER OF INTERPOLATION FRAMES TO BE INSERTED | 1 | 2 OR 3 | 4 |

FIG.23

| PROGRAM GENRE | JUDGMENT SIGNAL |
|---|---|
| NEWS/REPORTS | 0 |
| SPORTS | 1 |
| INFORMATION WIDE SHOWS | 0 |
| DRAMAS | 1 |
| MUSIC | 0 |
| VARIETIES | 1 |
| MOVIES | 1 |
| ANIMATIONS/SPECIAL EFFECTS | 1 |

FIG.24

| EIT JUDGMENT SIGNAL | WIDE MODE | DYNAMIC FRC OPERATION MODE |
|---|---|---|
| 1 | SMOOTH | 1 |
| 1 | FULL | 1 |
| 0 | SMOOTH | 1 |
| 0 | FULL | 0 |

VIDEO PROCESSING APPARATUS AND VIDEO DISPLAY APPARATUS

INCORPORATION BY REFERENCE

The present application claims priority from Japanese application JP2007-069758 filed on Mar. 19, 2007, the content of which is hereby incorporated by reference into this application.

BACKGROUND OF THE INVENTION

This invention relates to a video processing apparatus and more particularly to a technique for effectuating frame rate conversion by using interpolation frames derived from the frames in the video signal.

Recently, an industrial trend has become prevailing that the frame rate conversion technique is used as means for improving the quality of images displayed on a display apparatus by increasing the number of frames in a video signal so as to suppress such unnatural motions in animations as blurs and motion judder or irregularity. In order to obtain a definite improvement on the animation quality, however, interpolation frames with high precision must be generated. A conventional, high-level method of frame interpolation uses the motion compensation processing wherein a motion vector representing a motion from one frame to another is generated by using the current frame and the frame immediately preceding the current frame. According to this method, the interpolation frames are generated by detecting inter-frame motions depending on the data on the motion vectors. To obtain interpolation frames with high precision requires high precision in the motion vectors. For this purpose, there have been proposed a method wherein motion vectors are searched in two successive stages (e.g. Toshiba Review, Vol. 59, No. 12, (2004)) and a method wherein a smoothing processing is performed by eliminating unwanted motion vectors through comparison among ambient motion vectors (e.g. JP-A-2002-27414 (Paragraph 9, FIG. 9)).

However, such conventional motion compensation processes makes it difficult to obtain precise motion vectors in the case where plural motions take place or plural moving bodies cross their loci of motion, in a scene. As a result, an image breakdown in display may be caused.

SUMMARY OF THE INVENTION

This invention, which has been made to overcome the problems of those conventional methods as mentioned above, aims to provide a technique which enables the detection of motion vectors with higher precision and the frame rate conversion with high image quality.

This invention, to fulfill this purpose, is characterized by the constitutions as characterized in the attached claims. Namely, the interpolation processes along the horizontal, vertical and temporal axes performed in the interpolation frame generation unit are adaptively switched in accordance with remarkable features in inter-frame motions.

According to such constitutions, as a result of processing for frame rate conversion using the motion compensation method, an adaptive interpolation control can be effected by detecting features in images so that the qualities of the resultant animations can be improved and that the breakdown of displayed images can be prevented.

According to this invention, therefore, motion vectors can be detected with higher precision, and as a result the frame rate can be converted while maintaining high quality in displayed images.

Other objects, features and advantages of the invention will become apparent from the following description of the embodiments of the invention taken in conjunction with the accompanying drawings.

BRIEF DESCRIPTION OF THE DRAWINGS

FIG. 23 is a table showing programs of different genres; and

FIG. 24 is a table illustrating the classification of the modes of the dynamic FRC processing.

DESCRIPTION OF THE EMBODIMENTS

Now, embodiments of this invention will be described in reference to the attached drawings.

Embodiment 1

Figure 1:
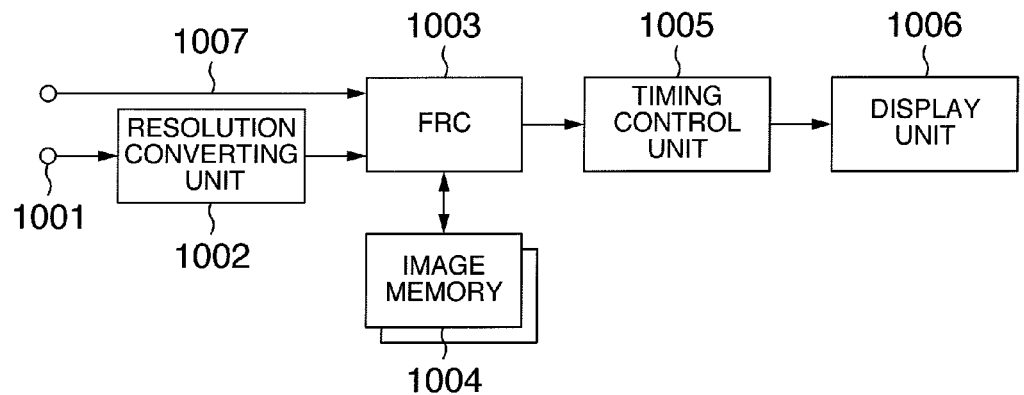
FIG. 1 is a block diagram of a first embodiment of this invention.

FIG. 1 is a block diagram of a video processing apparatus as a first embodiment of this invention. In FIG. 1 are shown an input signal 1001, a resolution converting unit 1002, a frame rate conversion (hereafter referred to as FRC for short) unit 1003, an image memory 1004, a timing control unit 1005, a display unit 1006, and an FRC mode signal 1007.

The resolution converting unit 1002 converts the format of the input image into an enlarged or a reduced image format adapted to the display unit 1006. The FRC unit 1003 performs frame rate conversion in accordance with the FRC mode signal 1007 which is externally defined. The timing control unit 1005 makes adjustment of timing necessary to properly display on the display unit 1006 the frame rate conversion output derived from the FRC unit 1003.

Figure 2:
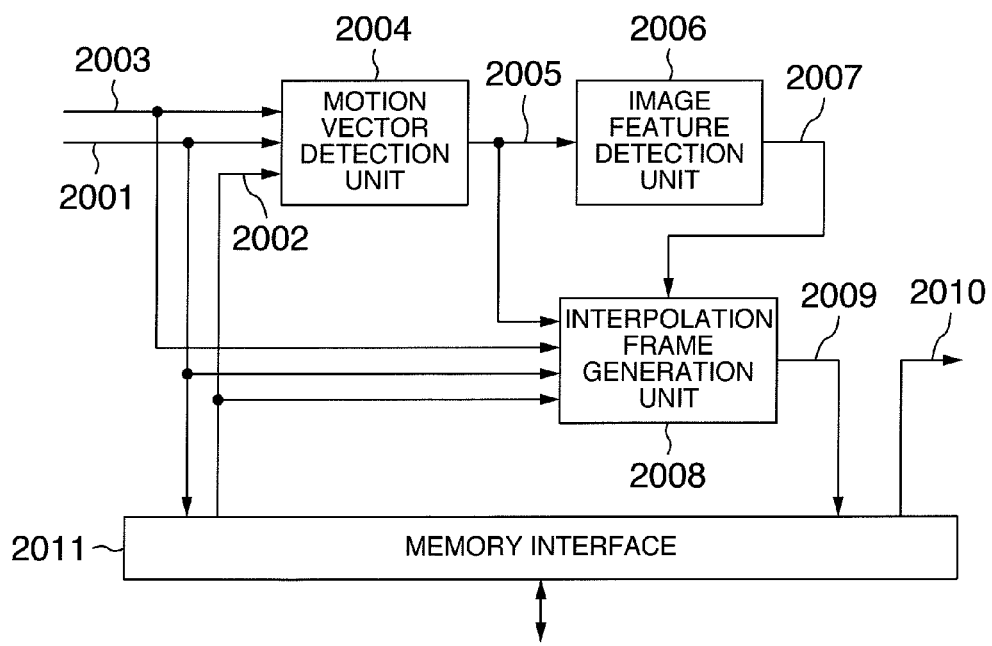
FIG. 2 schematically shows an example of the frame rate conversion (FRC) unit used in the first embodiment shown in FIG. 1.

FIG. 2 schematically shows an example of the frame rate conversion (FRC) unit used 1003 in the first embodiment shown in FIG. 1.

In FIG. 2 are shown a current frame signal 2001, a preceding frame signal 2002 immediately preceding the current frame signal 2001, an FRC mode signal 2003, a motion vector detection unit 2004, a motion vector signal 2005, an image feature detection unit 2006, a judgment signal 2007, an interpolation frame generation unit 2008, an interpolation frame signal 2009, a frame rate conversion (FRC) output signal 2010, and a memory interface (I/F) 2011.

Figure 3:
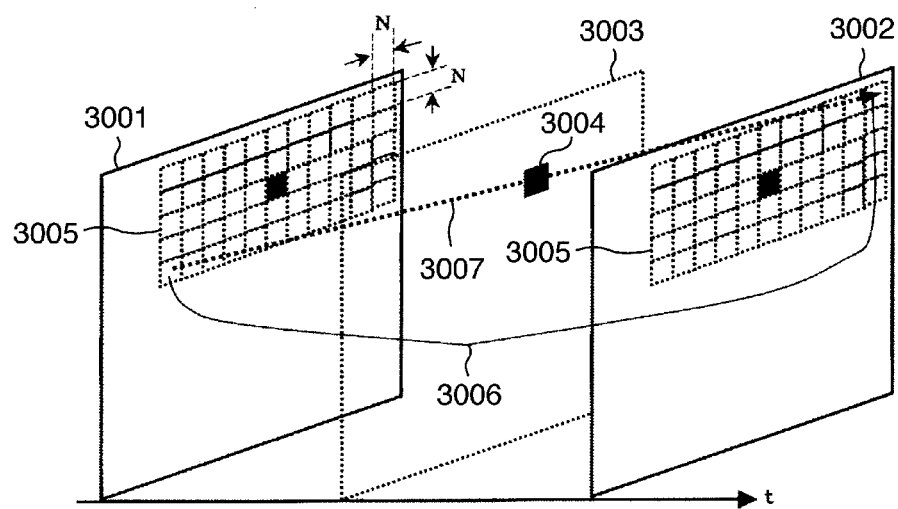
FIG. 3 depicts how an interpolation frame is generated according to the block matching method.

The motion vector detection unit 2004 detects the motion vector signal 2005 on the basis of the current frame signal 2001 and the preceding frame signal 2002. To detect the motion vector signal 2005, any conventional method such as the block matching method, the gradient method, or the phase correlation method may be used. However, the following description is made of the case where the N×N block matching method (N is a positive integer) as shown in FIG. 3 is employed. In FIG. 3 are shown a current frame signal 3001, a preceding frame signal 3002, an interpolation frame signal 3003, a specified block 3004 for interpolation, a motion vector search domain 3005, a minimum difference value block pair 3006, and a motion vector 3007.

Each of the motion vector search domains 3005 on the current frame signal 3001 and the preceding frame signal 3002 consists of a predetermined number of blocks aggregated around a central block. The specified interpolation block 3004 on the interpolation frame signal 3003 is situated at the center of the point symmetry with respect to the central blocks of the current frame signal 3001 and the preceding frame signal 3002. As shown in FIG. 3, the motion vector search domain 3005 is in the form of an area consisting of eleven (11) horizontal blocks×five (5) vertical blocks. The paired blocks 3006 giving the minimum difference value are determined through the difference value matching process wherein those paired blocks on the current frame signal 3001 and the preceding frame signal 3002 which are located point-symmetrically in the direction of the temporal axis with respect to the specified block 3004, are subjected to difference value calculation. The directional line segment connecting between the paired blocks 3006 that give the minimum difference value is defined as the motion vector 3007, and the signal representing this motion vector 3007 is outputted as a motion vector signal 2005.

The obtained motion vector 3007 (or actually the motion vector signal 2005) is fed into the interpolation frame generation unit 2008. The interpolation frame generation unit 2008 calculates the pixel value for the specified block 3004 on the interpolation frame signal 3003 as the average of the pixel values allotted to the paired blocks 3006 that give the minimum difference value.

In reference to FIG. 3, description has been made of the case where a single interpolation frame is inserted at the temporally middle point between the frames transmitted at the original frame repetition rate (hereafter referred to as "key frames"), such as a case where frame rate is converted from 60 Hz to 120 Hz. In reference to FIG. 4, on the other hand, an example is shown where plural interpolation frames are inserted between the adjacent key frames as in the case of movies where frame conversion is from 24 Hz to 60 Hz. The FRC mode signal 1007 (2003) determines the mode of frame conversion such as from 24 Hz to 60 Hz or from 60 Hz to 120 Hz.

Figure 4:
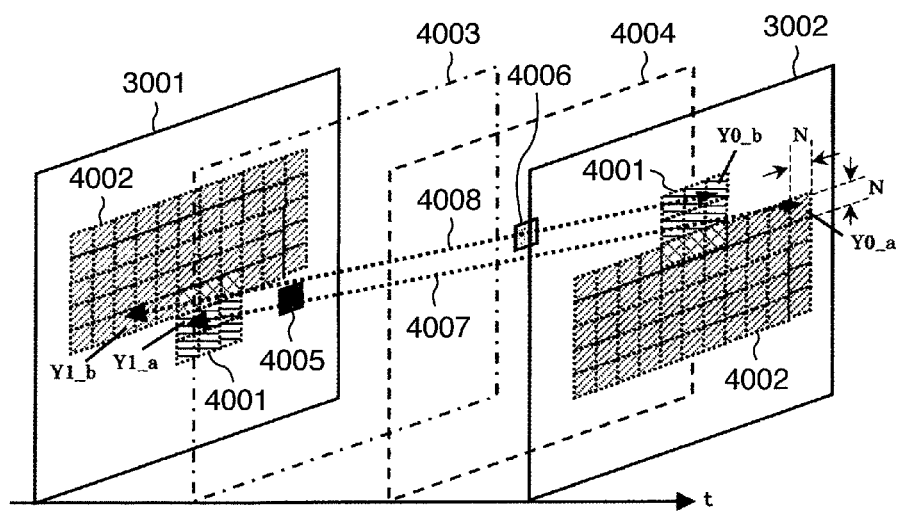
FIG. 4 depicts how plural interpolation frames are generated according to the block matching method.

In FIG. 4, components equivalent to those shown in FIG. 3 are indicated with the same reference numerals and their description is omitted.

In FIG. 4 are shown a first motion vector search domain 4001, a second motion vector search domain 4002, a first interpolation frame 4003, a second interpolation frame 4004, a first specified block 4005, a second specified block 4006, a first motion vector 4007, and a second motion vector 4008.

As shown in FIG. 4, the first specified block 4005 on the first interpolation frame 4003 is associated with the first motion vector search domain 4001 on the current frame 3001 and the second motion vector search domain 4002 on the preceding frame 3002. The second motion vector search domain 4002 is larger in area than the first motion vector search domain 4001, as is evident from FIG. 4. This is because the time interval between the current frame 3001 and the first interpolation frame 4003 is smaller than the time interval between the first interpolation frame 4003 and the preceding frame 3002 so that, for the same solid angle having the center at the first specified block 4005, the area (i.e. first vector motion search domain 4001) subtended by the solid angle on the current frame 3001 is smaller than the area (i.e. second vector motion search domain 4002) subtended by the solid angle on the preceding frame 3002. In like manner, for the second specified block 4006 on the second interpolation frame 4004, it is necessary to set the second motion vector search domain 4002 on the current frame 3001 and the first motion vector search domain 4001 on the preceding frame 3002, due to a difference of temporal barycentric positions, that is the temporal interval between the current frame 3001 and the second interpolation frame 4004 is larger than the temporal interval between the second interpolation frame 4004 and the preceding frame 3002. As in the conversion from 60 Hz to 120 Hz as described above, the difference value matching calculation is performed within those vector motion search domains, the pair of blocks for which the difference value between their pixel values becomes minimum are calculated, and the directional segment defined between the paired blocks is specified as the motion vector of interest and outputted as such. It is noted here that since there are two interpolation frames, there are two relevant motion vectors 4007, 4008. The interpolation frame generation unit 2005 calculates the pixel values for interpolation in consideration of the temporal barycentric positions of the interpolation frames 4003, 4004 along the time axis. Namely, the pixel values I(1) and I(2) of the first specified block 4005 on the first interpolation frame 4003 and the second specified block 4006 on the second interpolation frame 4004 are calculated in consideration of the temporal barycentric positions of the interpolation frames 4003, 4004 along the time axis, through the weighted summation given by the following expressions (1) and (2).

$$I(1)=(3*Y1\_a+2*Y0\_a)/5 \tag{1}$$

$$I(2)=(Y1\_b+4*Y0\_b)/5 \tag{2}$$

Figure 5:
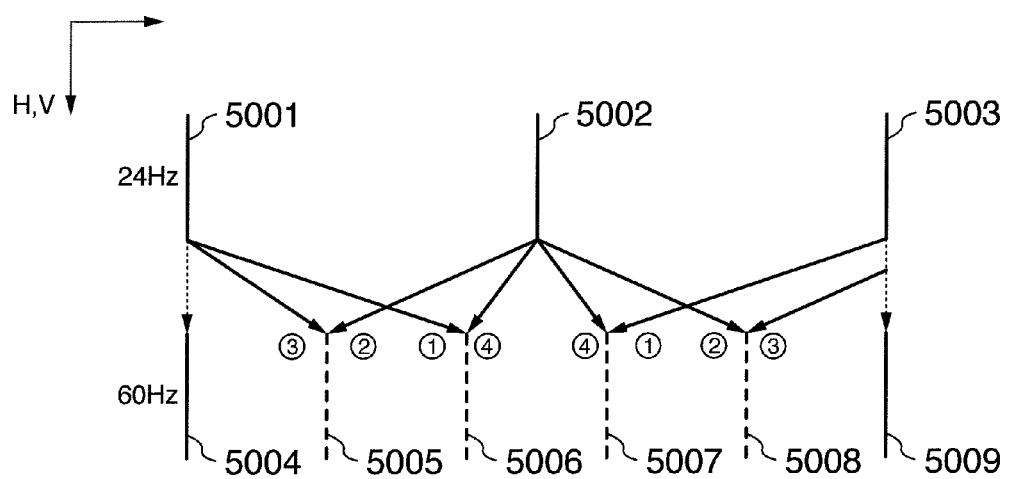
FIG. 5 is a diagram for illustrating the weighted summation along the temporal axis in the generation of interpolation frames in the FRC unit.

FIG. 5 is a diagram for illustrating the weighted summation along the temporal axis in the generation of interpolation frames in the FRC unit. In FIG. 5 are shown video frames 5001~5003 repeated at 24 Hz, video frames 5004~5009 repeated at 60 Hz, and the circled numerals attached to arrows indicating the weighting values along the time axis used in the generation of interpolation frames. The interpolation frames 5005~5008 are calculated by the use of the expressions (1) and (2) given above.

The memory interface 2011 writes the data as the interpolation frame signal outputted from the interpolation frame generation unit 2008 into the image memory 1004, reads out the stored data at the frame rate corresponding to the FRC mode signal 1007, and delivers the frame rate conversion output 2009. As shown in FIG. 5, in the case of conversion from 24 Hz to 60 Hz, the video signal is outputted with the key frame 5002 eliminated.

Figure 6:
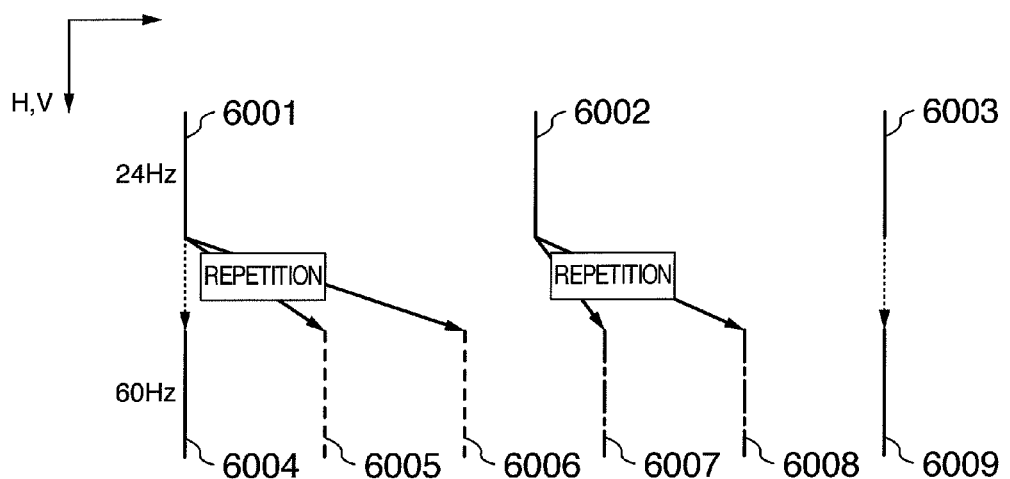
FIG. 6 is a diagram for illustrating how interpolation frames are generated according to the frame repetition scheme.

In addition to the capability of performing the process of generating interpolation frames in the ordinary FRC operation (hereafter referred to as vector FRC operation) as described above, the interpolation frame generation unit 2008 can switch to the non-vector FRC operation, that is, the process for generating interpolation frames through frame repetition as shown in FIG. 6, depending on the judgment signal delivered from the image feature detection unit 2006 as described later.

Figure 7:
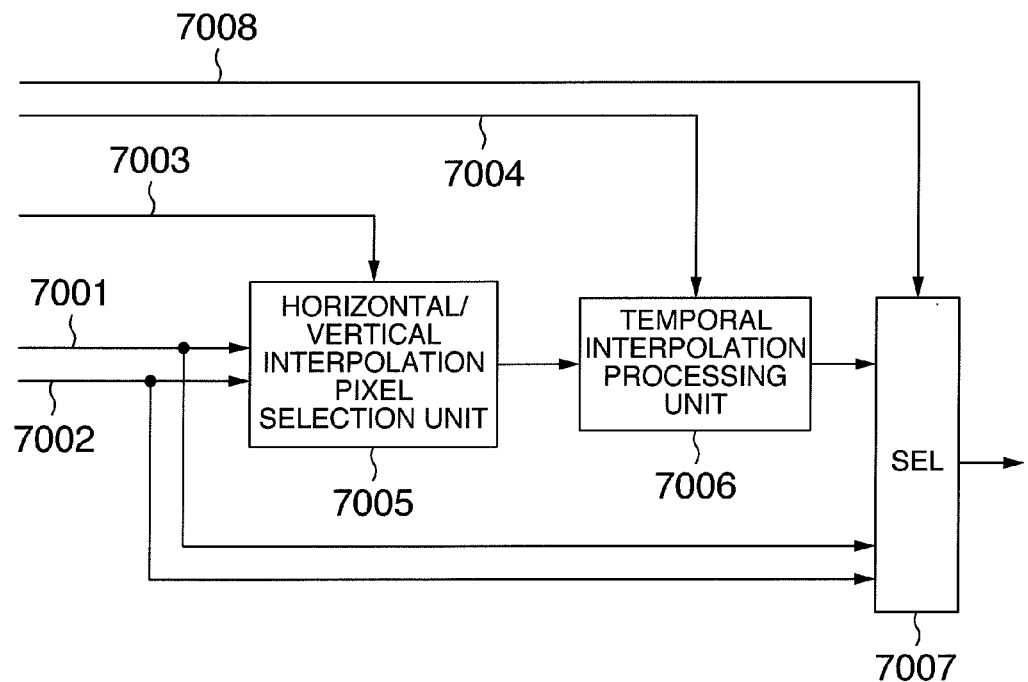
FIG. 7 schematically shows an example of the interpolation frame generation unit used in the first embodiment shown in FIG. 1.

FIG. 7 schematically shows an example of the interpolation frame generation unit used 2008 in the first embodiment shown in FIG. 1. In FIG. 7 are shown a current frame signal 7001, a preceding frame signal 7002, a motion vector signal 7003, an FRC mode signal 7004, a horizontal/vertical interpolation pixel selection unit 7005, a temporal interpolation processing unit 7006, a selector 7006, and a judgment signal 7008.

Now, the conclusion obtained through the frame rate conversion concerning the evaluation of the quality of animations will be briefed as follows.

In the frame rate conversion wherein a single interpolation frame is inserted between two adjacent key frames, as in the integral multiple FRC such as conversion from 60 Hz to 120 Hz or from 30 Hz to 60 Hz, the degradation of image quality in the inserted frame is hard to discern by human eyes though detectable to a certain extent through the detection of motion vector errors. As a result, the evaluation is on the side of the temporal resolution having been improved. On the other hand, in the case where plural interpolation frames are inserted between two adjacent key frames, as in the non-integral multiple FRC such as conversion from 24 Hz to 60 Hz or from 50 Hz to 60 Hz, if the degradation of image quality in those interpolation frames is to such an extent that it is detectable through the motion vector error detection, such degradation in image quality can be sensed by human eyes and overrides the improvement in the temporal resolution since more than one degraded frame are continued in temporal.

The degradation of image quality in an interpolation frame detected through the detection of motion vector errors will be described in the following.

Figure 8:
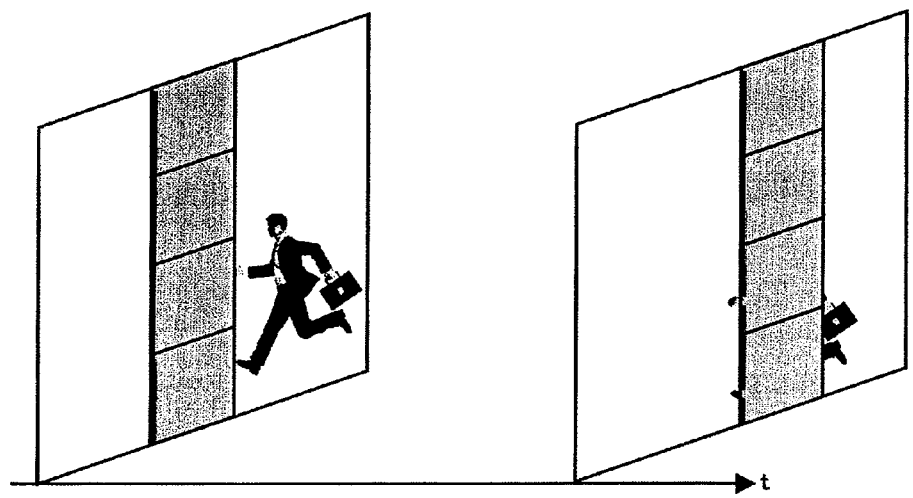
FIG. 8 shows an example of image pattern which may lead to an error in detecting motion vectors.

In the detection of motion vectors as described above, the correlations are calculated through the difference value matching operation with respect to blocks or pixels in the video images on the current and preceding video frames, and the pixel values for the interpolation frame are calculated by using those pixel values which give the highest correlations. As shown in FIG. 8, however, if some consecutive frames represent a scene in which a certain moving object passes behind a large sight-blocking object, then at least part of the moving object disappears from those consecutive frames. Consequently, it becomes impossible to calculate precise motion vectors in this case. Further, in the detection of motion vectors, in order to improve the precision in the detected motion vectors, use is usually made of the procedure wherein reference is made to motion vectors detected around the target motion vector or motion vectors distributed all over a screen. With this procedure, motion vectors with relatively high precision can be obtained for the video environment where an entire screen is being panned in a certain direction. However, for the video environment where there are plural different movements in a screen, it becomes increasingly difficult with the increase in the number of different motions to detect moving vectors with high precision. Further, in the case of a very swift movement where the motion vector runs off from the motion vector search domain, the precise detection of motion vector becomes impossible and the breakdown of images may ensue. The simplest countermeasure against this image disruption is to increase the area of the motion vector search domain. Such a countermeasure, however, leads readily to the increase in the probability of erroneous detection of motion vectors and further to the increase in not only the amount of calculations but also the scale of circuitry realized through hardware configuration.

This embodiment of the present invention solves the above mentioned problem by the use of the procedure wherein frame interpolation processes are switched over depending on the features of video signals, that is, images to be pictured. According to this embodiment, motion vector histogram data are collected for each frame and the processes for interpolation are dynamically switched over on the basis of the collected motion vector histogram data. This procedure is referred to hereafter as "dynamic FRC" throughout the specification.

Figures 9, 10:
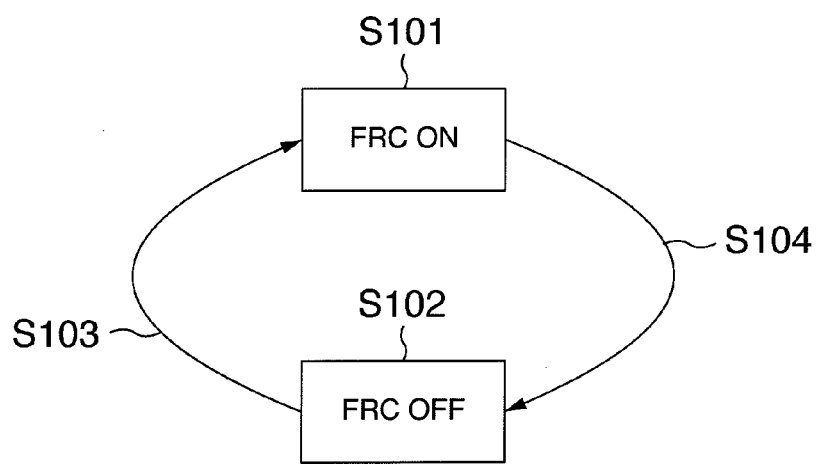
FIG. 9 is a state diagram for explaining the dynamic FRC process.
FIG. 10 shows a table in which the counts of motion vectors are recorded.

FIG. 9 is a state diagram for explaining the dynamic FRC process according to this invention. In FIG. 9, S101 indicates the state where the vector FRC operation is going on to generate interpolation frames by using motion vectors, whereas S102 denotes the state where non-FRC operation is going on to generate interpolation frames through frame repetition.

The state transition (S103 or S104) between the states S101 and S102 is performed by means of the image feature detection unit 2006, depending on the judgment of the features of motions.

The image feature detection unit 2006 detects motion vectors to compile vector histogram data, extracts the features of motions from the vector histogram data, and delivers a judgment signal 2007.

FIG. 10 shows a table in which the counts of motion vectors are recorded to compile the vector histogram data. The table shown in FIG. 10 corresponds to the case where the motion vector search domain covered by the motion vector detection unit 2004 consists of the area of five (5) vertical blocks× eleven (11) horizontal blocks.

Figure 11:
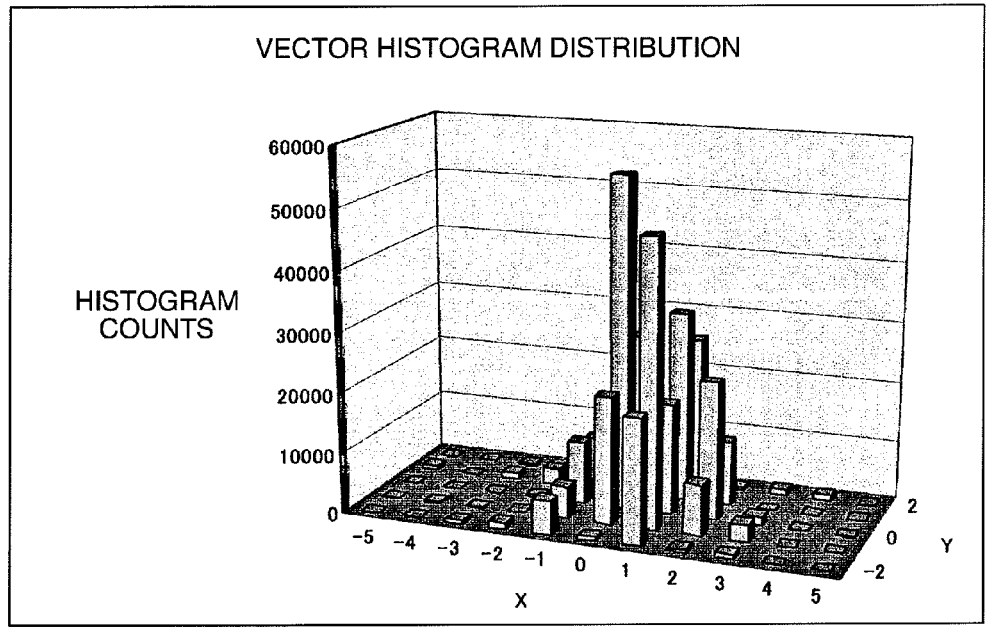
FIG. 11 shows in three-dimensional histogram a first example of the counts of motion vectors.

FIG. 11 shows the three-dimensional motion vector histogram constructed on the basis of the motion vector data, i.e. motion vector counts, of the table shown in FIG. 10. As seen in FIG. 11, the motion vector histogram indicates that many motion vectors concentrate around the vector (0, 0). The image feature detection unit 2006 judges the features of motions on the basis of such a histogram showing the distribution of motion vectors.

Figure 12:
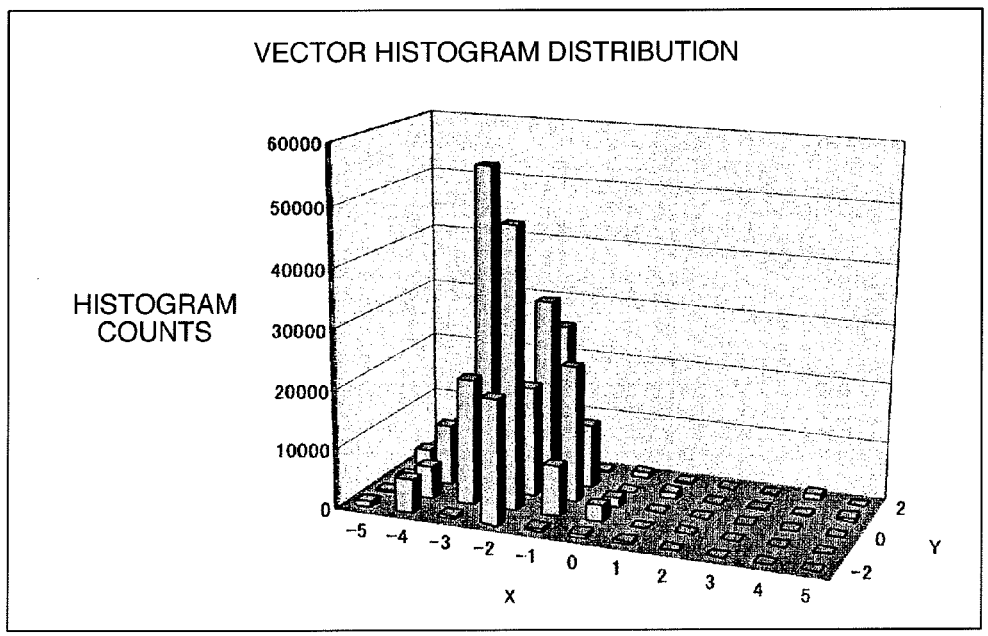
FIG. 12 shows in three-dimensional histogram a second example of the counts of motion vectors.

FIG. 12 shows in three-dimensional histogram a second example of the counts of motion vectors. As seen in FIG. 12, if motion vectors concentrate in a certain direction, then judgment is passed that there is high probability that an entire image is scrolling according to a prevailing motion in the scene.

Figure 13:
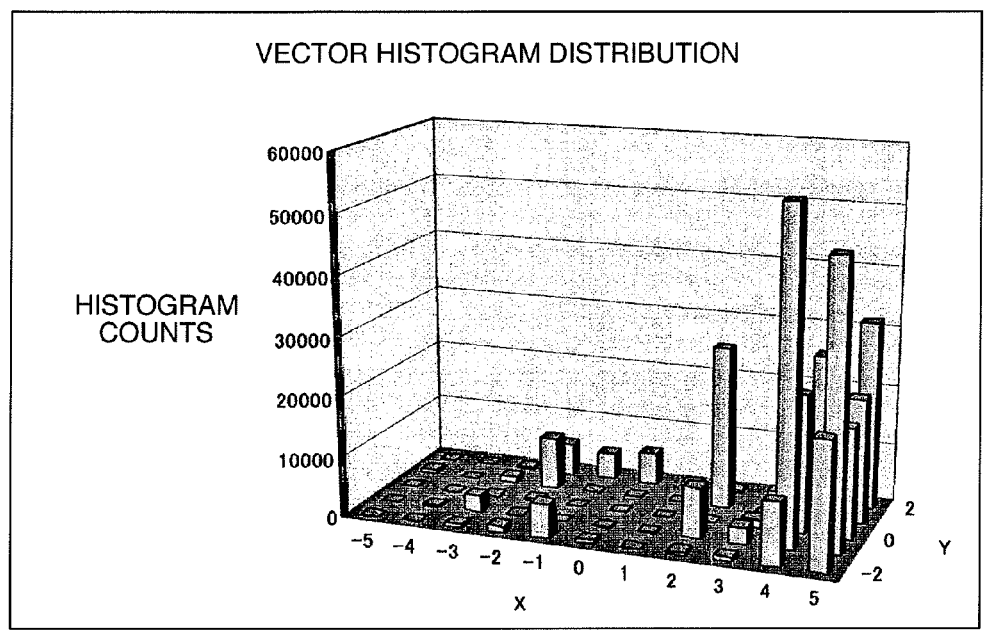
FIG. 13 shows in three-dimensional histogram a third example of the counts of motion vectors.
Figure 14:
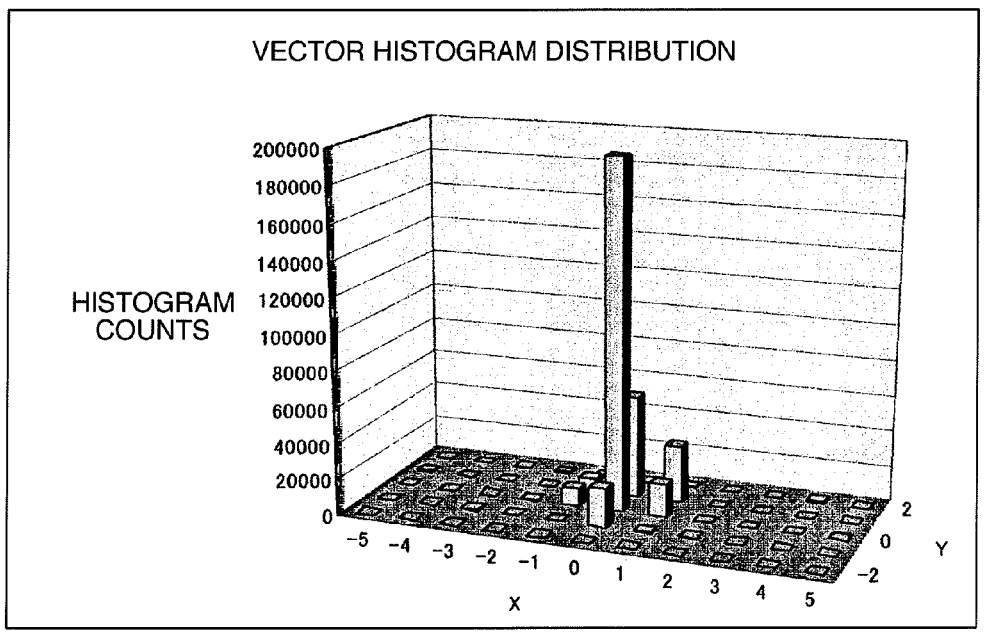
FIG. 14 shows in three-dimensional histogram a fourth example of the counts of motion vectors.
Figure 15:
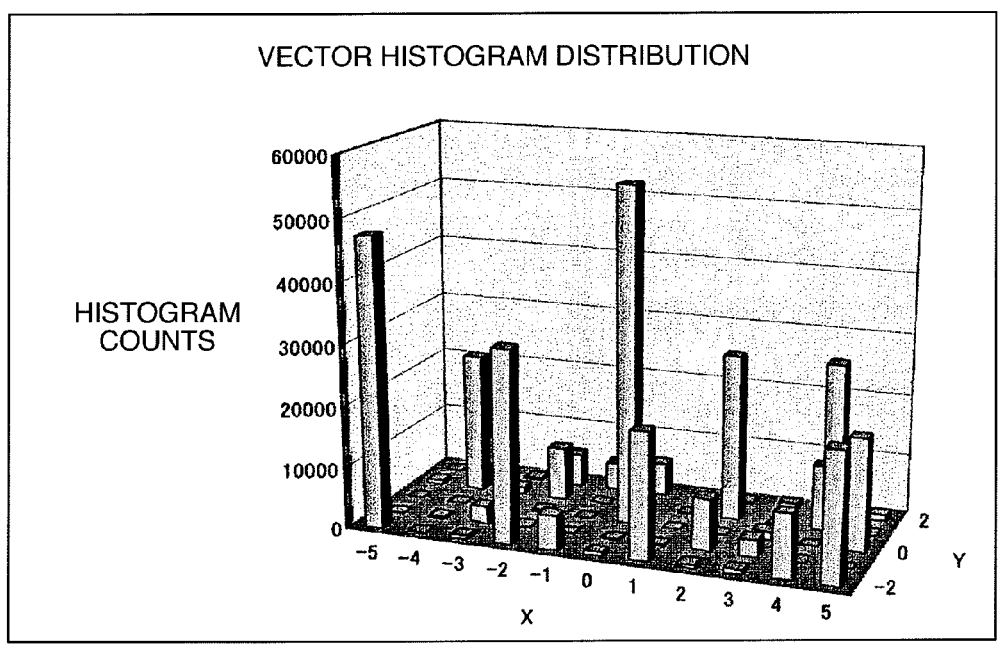
FIG. 15 shows in three-dimensional histogram a fifth example of the counts of motion vectors.

FIG. 13 shows in three-dimensional histogram a third example of the counts of motion vectors. As seen in FIG. 13, if motion vectors concentrate in the boundary area of the motion vector search domain, with the counts of the concentrated motion vectors exceeding a certain threshold value, then judgment is made that there is high probability that there are numerous motions swift enough to run off beyond the boundary of the motion vector search domain. Another judgment is to use the presumption that even though there are no matched blocks for a motion swift enough to run off beyond the boundary of the motion vector search domain, plural block pairs that give comparable difference values still remain in the motion vector search domain. For example, if an algorithm is used which prioritizes a vector (0, 0) or another vector near it when there are matched block pairs that give the same difference value, it is considered that motion vector counts will concentrate at the vector (0, 0) as shown in FIG. 14. Accordingly, if the counts at the vector (0, 0) exceed a predetermined threshold value, judgment is passed that there are motions swift enough to run off beyond the boundary of the motion vector search domain. Whether or not the counts concentrate at the vector (0, 0) depends on the type of algorithm used in the detection of motion vectors. This invention is by no means restricted to the use of such an algorithm alone. Further, as shown in FIG. 15, if the counts greater than the threshold value are scattered, judgment is passed that there are plural motions over a scene.

When the image feature detection unit 2006 inputs the video signals representing such distributions of the motion vector counts as shown with the histograms in FIGS. 12~15, the unit 2006 outputs a judgment signal 2007 indicating the type of distribution. The judgment signal 2007 may be represented by, for example, a single bit "0" or "1". For the motion vector count distribution shown with the vector histogram in FIG. 12, judgment is passed that the motion vectors have been detected with high precision, and therefore judgment signal "0" is outputted. For the histograms shown in FIGS. 13~15, judgment is that the motion vectors have been detected with low precision and that the probability of erroneous detection is appreciably high. As a result, judgment signal "1" is outputted. The selector 7007 switches between the output of interpolation frames generated through the vector FRC and the output of interpolation frames generated through the frame repetition, according to the judgment signal "0" or "1". Accordingly, when the judgment signal 2007 is "0" (S103), the state of vector FRC operation (S101) is assumed whereas when the judgment signal 2007 is "1" (S104), the state of non-FRC operation (S102) is assumed. In the state transitions (S103, S104), in order to avoid an adverse effect caused by frequent switching of states, hysteretic characteristic may be incorporated wherein transition takes place only after the state "0" (or "1") of the judgment signal 2007 continues for a predetermined number of frame periods or wherein the state assumed after a transition continues for a predetermined periods.

In this embodiment, the detection of motion features is performed by means of hardware, but this invention is by no means restricted to this constitution. For example, it is possible that only data on motion vectors are handled by means of hardware whereas the dynamic FRC control is performed by means of software.

Further, the changeover between the outputs of the differently generated interpolation frames need not be necessarily performed by the interpolation frame generation unit 2008, but may be effectuated through the data reading control by means of the memory interface 2011.

As described above, according to this embodiment, the features of motions in the inputted images can be detected and the states of the FRC operations can be switched over in accordance with the features of motions.

Embodiment 2

Figure 16:
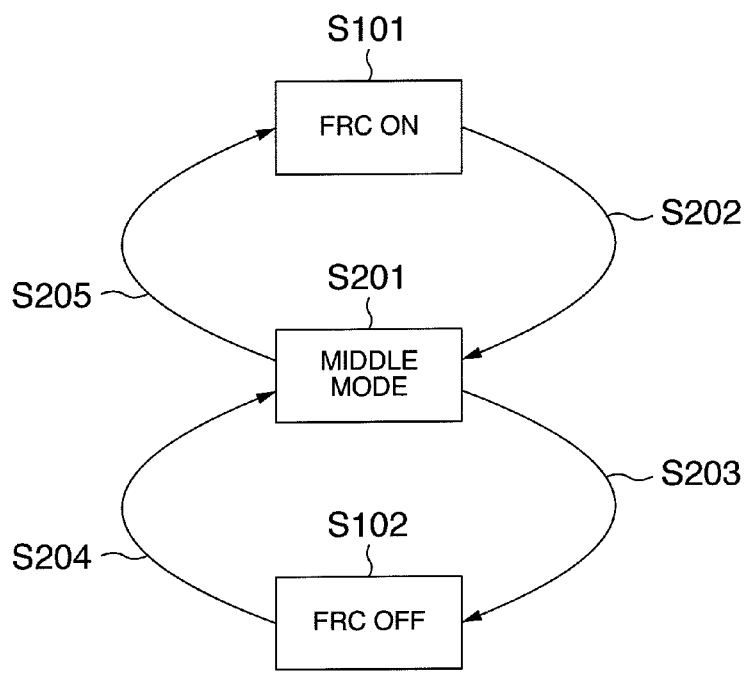
FIG. 16 is a state diagram for explaining the dynamic FRC processing as a second embodiment of this invention.

FIG. 16 is a state diagram for explaining the dynamic FRC processing of the video processing apparatus as a second embodiment of this invention. In FIG. 16, components equivalent to those shown in FIG. 9 are indicated with the same reference numerals and their description is omitted.

In this embodiment are provided three states of FRC operations so as to effectuate a better control of images. In the following is described that part of the FRC operation which differs from the FRC operation according to the first embodiment described above.

As shown in FIG. 16, the middle mode S201 is an intermediate state between the vector FRC operation and the non-FRC operation. Each of these three states is assumed in accordance with the transition conditions described later. The vector FRC operation (S205), the middle mode operation (S202, S204) or the non-FRC operation (S203) takes place according respectively as the judgment signal 2007 outputted from the image feature detection unit 2006 is "0", "1" or "2".

Figure 17:
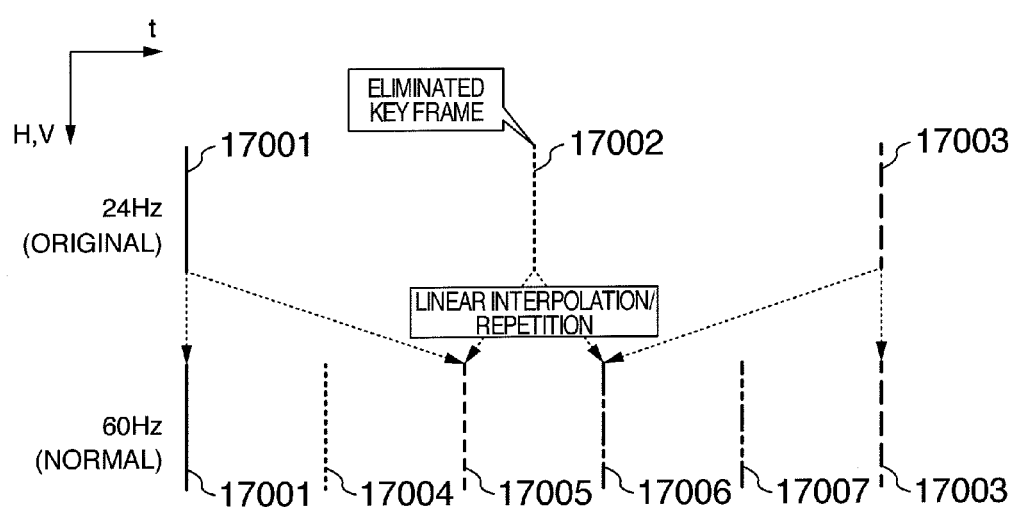
FIG. 17 depicts how interpolation frames are generated in the middle mode operation.

FIG. 17 depicts how interpolation frames are generated in the middle mode operation, the frame conversion being from 24 Hz to 60 Hz. In FIG. 17 are shown input key frames 17001~17003, and interpolation frames 17004~17007. When the vector FRC operation (S101) takes place, all the interpolation frames are generated through the interpolation using motion vectors. When the non-FRC operation (S102) takes place, all the interpolation frames are generated through the interpolation using the repetition of key frames. Namely, the key frame 17001 is inserted as interpolation frames 17004 and 17005, and the key frame 17002 is inserted as the interpolation frames 17006 and 17007. In the middle mode operation (S201), as shown in FIG. 17, the interpolation frames 17005 and 17006 are substituted with the key frame, or alternatively they are newly generated as linear interpolation frames formed in consideration of the temporal barycentric positions along the time axis. The linear interpolation frames in consideration of the temporal barycentric positions are actually formed by making weighted summation depending on the temporal barycentric positions along the time axis according to the horizontal/vertical vectors (0, 0) for the key frames 17001 and 17002. The resultant images according to this embodiment, so far as the smoothness in animations as the original effect of the frame rate conversion is concerned, appear poorer than the images formed through the generation of perfect interpolation frames. However, the resultant images are good enough to be free from image breakdowns and can also maintain the evidence of quality improvement.

Figure 18:
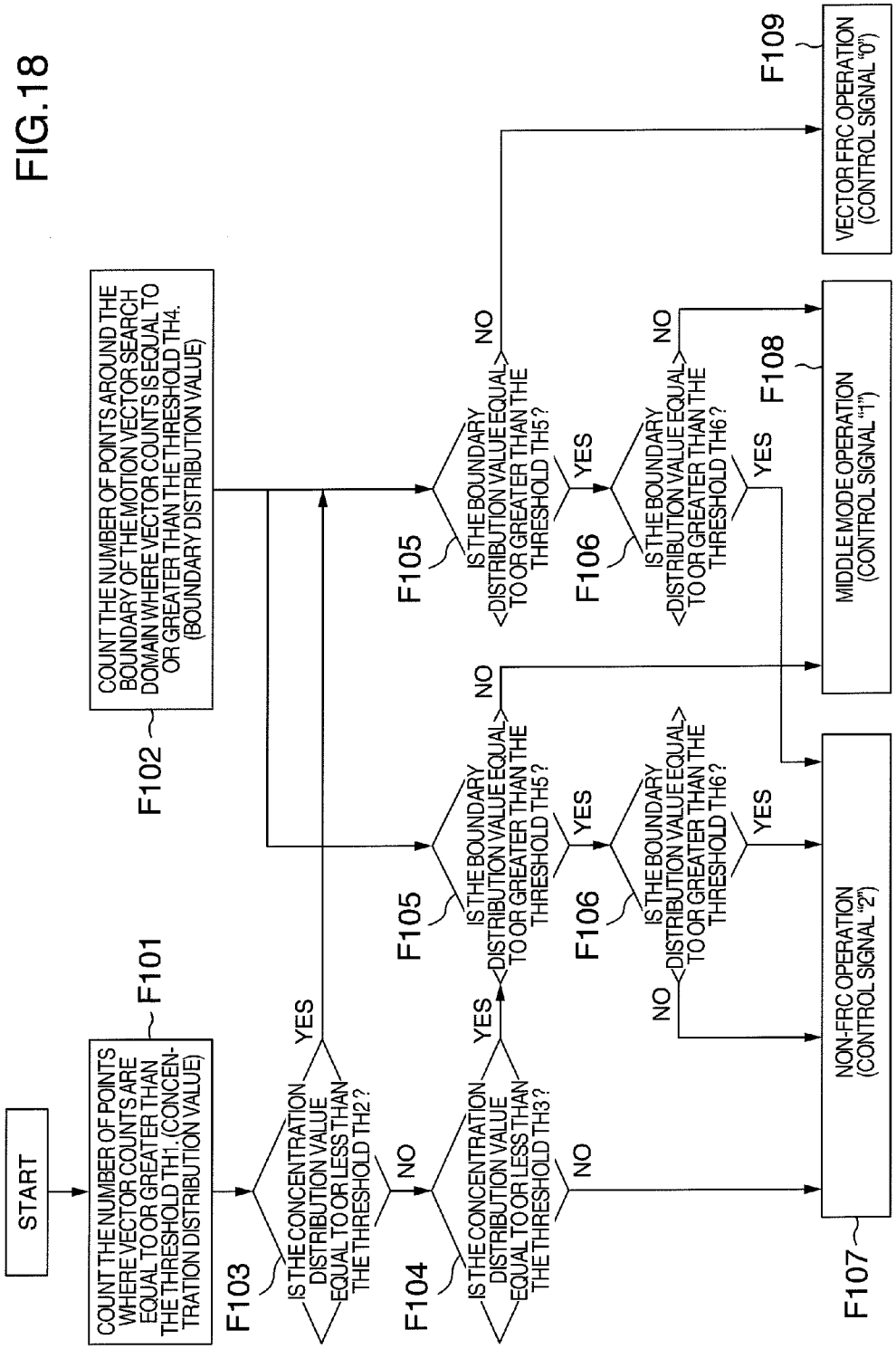
FIG. 18 is a flow chart for the dynamic FRC processing.

In order to select one of the three operating states, the image feature detection unit 2006 outputs the judgment signal 2007 indicating which operating state to be assumed. For example, the judgment signal 2007 is to take one of the two bit binary arrangements "00", "01" or "10" corresponding to the states 0, 1 and 2. In comparison with the judgment signal using "0" and "1" described in the foregoing Embodiment 1, the changeover to "0", "1" or "2" is performed by providing the process of controlling threshold values. Such threshold control is explained with reference to the flow chart in FIG. 18.

With respect to the vector concentration, the concentration distribution value, i.e. the number of points at which the motion vector counts are equal to or greater than the vector count threshold TH1, is counted (F101). With respect to the boundary distribution, the boundary distribution value, i.e. the number of points around the boundary of the motion vector search domain at which the motion vector counts are equal to or greater than the boundary vector count threshold TH4, is counted (F102).

Then, the concentration distribution value is compared with the concentration distribution thresholds TH2 and TH3 (F103, 104). Also, the boundary distribution value is compared with the boundary distribution thresholds TH5 and TH6 (F105, 106). If the concentration distribution value is equal to or less than TH2, and if the boundary distribution value is less than TH5, then the vector FRC operation is selected (F109). If the concentration distribution value is equal to or less than TH2, and if the boundary distribution value is equal to or greater than TH5 and less than TH6, then the middle mode operation is selected (F108). If the concentration distribution value is greater than TH2 and equal to or less than TH3, and if the boundary distribution value is less than TH5, then the middle mode operation is also selected (F108). If the concentration distribution value is greater than TH3, the non-FRC operation is selected (F107). Further, the non-FRC operation is also selected (F107) in the case where the concentration distribution value is equal to or less than TH2, and the boundary distribution value is equal to or greater than TH6, or in the case where the concentration distribution value is greater than TH2 and equal to or less than TH3, and the boundary distribution value is equal to or greater than TH6.

According to the control process as described above, the image feature detection unit 2006 outputs judgment signals "0" (for vector FRC operation), "1" (for middle mode operation), and "2" (for non-FRC operation).

Figure 19:
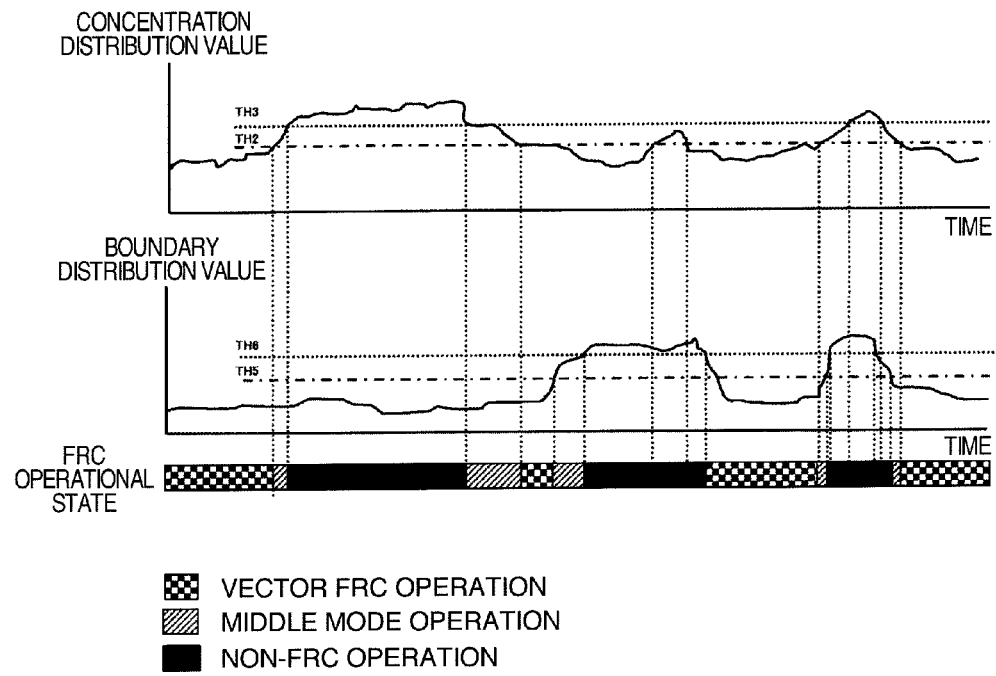
FIG. 19 is a diagram illustrating how the dynamic FRC control is performed.

FIG. 19 is a diagram illustrating how the dynamic FRC control is performed. As shown in FIG. 19, the three states of operations are dynamically selected or switched over. Basically, the middle mode operation is interposed during the transition from the vector FRC operation to the non-FRC operation (and during the reverse transition). Accordingly, the unnaturalness in images caused at the time of operation switchover can be alleviated.

In this second embodiment of the invention, for each value, states are classified according to three threshold values using the concentration distribution and the boundary distribution of vector. However, the number of the thresholds can be arbitrarily selected. Further, the concept of concentration may be replaced by the concept of dispersion, and as to the boundary distribution, it may also be handled in an idea in which the horizontal and vertical directions can be independently controlled.

Furthermore, as described in the Embodiment 1, the transitions to the respective operational states may be provided with hysteretic characteristics.

In the generation of the interpolation frames as shown in FIG. 17, two of the four interpolation frames are repeated frames or linear interpolation frames generated in consideration of the temporal barycentric positions along the time axis. However, other ways of generating interpolation frames are also possible. For example, one, three or all four interpolation frames may be formed as such linear interpolation frames. Further, more than three state transitions may be defined by dividing the middle mode into plural intermediate modes depending on the number of interpolation frames to be inserted.

Figure 20:
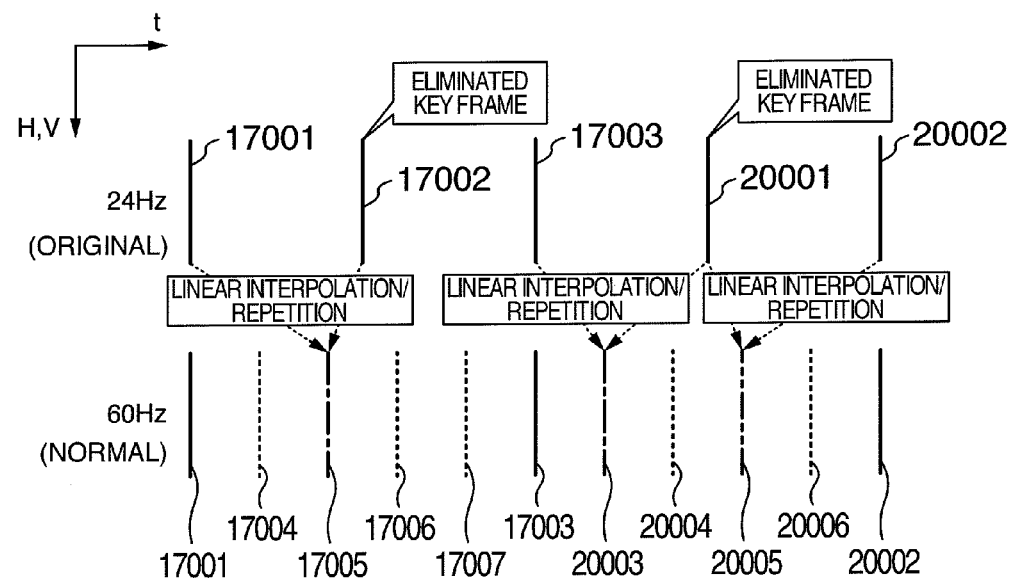
FIG. 20 shows how interpolation frames are generated in the dynamic FRC processing.

Moreover, as to the two repetition frames and the replaced positions of the linear frames, it is not limited to the positions of the frames of 17005 and 17006, but the frames 17004 and 17007 may be exchanged. Alternatively, as shown in FIG. 20, the number or the temporal positions of interpolation frames to be inserted may be changed at a predetermined number of periods or depending on the features of images. For example, by using such data as the concentration distribution information of vector as described above, the number of inserted interpolation frames may be decreased in case of high vector concentration whereas the number of inserted interpolation frames may be increased in case of low vector concentration, as shown in FIG. 21, in the middle mode operation.

As described above, according to the Embodiment 2 of this invention, the provision of the middle mode operation in addition to the ON/OFF mode of the state of FRC enables a better image control.

Embodiment 3

Figures 21, 22:
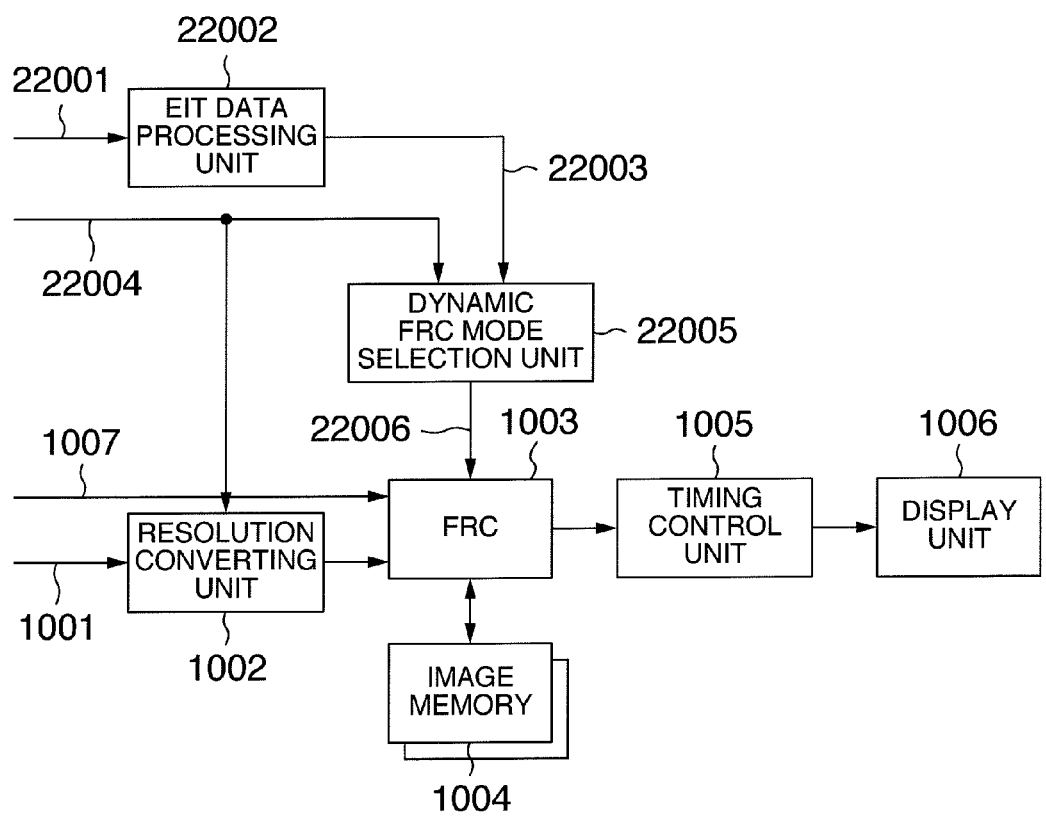
FIG. 21 is a table used for the explanation of interpolation frame generation in the dynamic FRC processing.
FIG. 22 schematically shows an example of the dynamic FRC processing as a third embodiment of this invention.

FIG. 22 shows a block diagram of a video processing apparatus as a third embodiment of this invention.

In FIG. 22, components equivalent to those shown in FIG. 1 are indicated with the same reference numerals and their description is omitted.

According to this embodiment, the most suitable one of plural interpolation procedures can be selected in a switching manner according to different genres of programs such as sports, news, movies, etc.

Also, the optimal interpolation control can be selected in a wide mode operation.

In the following is described that part which differs from the first and second embodiments described above.

In FIG. 22 are shown an event information table (EIT) data 22001, an EIT data processing unit 22002, an EIT judgment signal 22003, a wide mode signal 22004, a dynamic FRC mode selection unit 22005, and a dynamic FRC mode signal 22006.

In the BS/CS/terrestrial digital TV broadcast, not only video/audio/data signals but also information on programs (such as, for example, program titles, program contents, program broadcasting days, program starting times, program broadcasting durations, broadcasting channels, and program genre codes) are broadcasted simultaneously. The BS/CS/terrestrial digital TV broadcast transmitting/receiving apparatus utilizes program information called EIT and propagated from the broadcasting station. Namely, the transmitting/receiving apparatus obtains and restructures the program information and thereby provides an electronic program table function for users. As shown in FIG. 22, the EIT processing unit 22002 performs the operation for such classification as shown, for example, in FIG. 23, in accordance with program genre codes each consisting of a single byte representing content descriptors in the EIT. That is to say, the EIT judgment signal 22003 is "1" for the contents such as sports, animations/special picture taking, movies, dramas and varieties wherein there must be possibly swift motions in imaged objects, and "0" for the contents such as news and wide shows wherein there will not be many swift movements in the scene.

The wide mode signal 22004 is a signal for checking whether or not the 4:3 image is enlarged to the 16:9 image, or whether or not the image with black belts attached to the upper and lower edges thereof is in an expanded display. Namely, the wide mode signal 22004 represents the current mode set up by the user. Different makers use different mode names, but this embodiment uses the two kinds of terms: smooth (with enlargement) and full (without enlargement).

The dynamic FRC mode selection unit 22005 generates the dynamic FRC mode signal 22006 on the basis of the EIT judgment signal 22003 and the wide mode signal 22004. The dynamic FRC mode operation mentioned here refers to the switchover of the thresholds for selection among the three operating modes as described in the second embodiment. Namely, the operation of the image feature detection unit 2006 is determined by setting up one of these modes. In the dynamic FRC operation described in reference to FIG. 19, the time during which the vector FRC operation continues is increased by increasing the values of the thresholds. For example, there may be provided two kinds of tables: one having low thresholds and the other having high thresholds. With high thresholds, the time during which the vector FRC operation continues is increased so that improvement is easy to recognize but there is also a possibility of image breakdown being discernible. With low thresholds, on the other hand, improvement is little noticeable, but image breakdown is hard to discern.

In consideration of what is described above, the dynamic FRC mode selection unit 22005 outputs such dynamic FRC mode signals 22006 as shown in FIG. 24.

The dynamic FRC mode signal 22003 changes its value depending on the combinations of the contents of the EIT judgment signal and the details in the wide mode. The value is "1" for the program genre including scenes having lots of swift motions (where the EIT judgment signal is "1"). For the program genre including scenes having fewer swift motions (where the EIT judgment signal is "0"), the value is "1" when the wide mode is "smooth", and "0" when the wide mode is "full".

Upon receiving the dynamic FRC mode signals 22006, the image feature detection unit 2006 sets up a lower threshold value when the EIT judgment signal 22003 is "1", and a higher threshold value when the EIT judgment signal 22003 is "0".

As described above, according to this embodiment, it is possible to switch over interpolation procedures depending on the data on program genres enjoyed by the users or on the display modes.

In this embodiment, program genres are subjected to major classification where genres are divided into eight items, but the way of genre classification is by no means limited to this. For example, use may be made of a switchover mechanism based on intermediate classification that further divides each item of the major classification into multiple sub-items. Further in this embodiment, only two kinds of signals such as EIT judgment signal and wide mode signal are used in the switchover control, but this is by no means a restrictive condition. It will be better to use more various kinds of image features in the switchover control. In this embodiment, the values of the threshold are switched over in the switchover control, but this is not a restrictive condition, either. For example, the combination of operational modes may be made variable by using the switchover of the different durations of hysteretic characteristics given to the respective operational states.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video conversion apparatus for receiving an input video signal including a plurality of frames, generating interpolation frames in accordance with the frames of the input video signal, and converting into a video signal including a part of frame of the plurality of frames included in the input video signal and the interpolation frame, comprising:
   a motion vector detection unit for detecting a motion vector among the plurality of frames included in the input video signal;
   an image feature detection unit for detecting a feature of a video by generating histogram information concerned with the motion vector detected in the motion vector detection unit; and
   a series of interpolation frame generation unit for carrying out: a first interpolation frame generation processing for generating an interpolation frame using the motion vector detected by the motion vector detection unit and the plurality of frames included in the input video signal, a second interpolation frame generation processing for rendering one of frame in the plurality of frames included in the input video signal into an interpolation frame intact, and a third interpolation frame generation processing for rendering a linear interpolation frame of two frames among the plurality of frames included in the input video signal as an interpolation frame to generate the interpolation frame, to generate a series of interpolation frame including a part of frame of the plurality of frames included in the input video signal and the interpolation frame generated from the first to third interpolation frame generation processing; wherein
   the series of interpolation frame generation unit, in accordance with a judgment result judged by the image feature detection unit, switching among: a first operation for generating a series of frames including the interpolation frame generated in the first interpolation frame generation processing and a part of frame of the plurality of frames included in the input video signal, a second operation for generating a series of frames including the interpolation frame generated in the second interpolation frame generation processing and a part of frame of the plurality of frames included in the input video signal, and a third operation for generating a series of frames including the interpolation frame generated in the first interpolation frame generation processing and a part of frame of the plurality of frames included in the input video signal and the interpolation frame generated in the third interpolation frame generating processing, and
   in the series of frames generated by the third operation, the interpolation frame generated in the first interpolation frame generating processing is inserted between the frame included in the input video signal and the interpolation frame generated in the third interpolation frame generating processing.

2. A video conversion apparatus according to claim 1, wherein the series of interpolation frame generation unit, in accordance with a judgment result of the video characteristic judgment unit in accordance with a number of motion vector having a count number not smaller than a first threshold count number in a whole histogram, and a judgment result in accordance with a number of motion vector having not smaller than a second threshold count number in a boundary portion of motion detection range of the motion vector detection unit, for switching either the first to third operations for generating a series of frames.

3. A video display apparatus for receiving an input video signal including a plurality of frames, generating interpolation frames in accordance with the frames of the input video signal, and converting into a video signal including a part of frame of the plurality of frames included in the input video signal and the interpolation frame to display, comprising:
   a motion vector detection unit for detecting a motion vector among a plurality of frames included in the input video signal;

an image feature detection unit for detecting a feature of a video by generating histogram information concerned with the motion vector detected in the motion vector detection unit;

a series of interpolation frame generation unit for carrying out: a first interpolation frame generation processing for generating an interpolation frame using the motion vector detected by the motion vector detection unit and the plurality of frames included in the input video signal, a second interpolation frame generation processing for rendering one of frame in the plurality of frames included in the input video signal into an interpolation frame intact, and a third interpolation frame generation processing for rendering a linear interpolation frame of two frames among the plurality of frames included in the input video signal as an interpolation frame to generate the interpolation frame, to generate a series of interpolation frame including a part of frame of the plurality of frames included in the input video signal and the interpolation frame generated from the first to third interpolation frame generation processing; and a display unit for displaying a display signal including the series of interpolation frame generate by the series of interpolation frame generation unit; wherein the series of interpolation frame generation unit, in accordance with a judgment result judged by the image feature detection unit, switching among a first operation for generating a series of frames including the interpolation frame generated in the first interpolation frame generation processing and a part of frame of the plurality of frames included in the input video signal, a second operation for generating a series of frames including the interpolation frame generated in the second interpolation frame generation processing and a part of frame of the plurality of frames included in the input video signal, and a third operation for generating a series of frame including the interpolation frame generated in the first interpolation frame generation processing and a part of frame of the plurality of frames included in the input video signal and the interpolation frame generated in the third interpolation frame generating processing, and in the series of frames generated by the third operation, the interpolation frame generated in the first interpolation frame generating processing is inserted between the frame included in the input video signal and the interpolation frame generated in the third interpolation frame generating processing.

4. A video display apparatus according to claim 3, wherein the series of interpolation frame generation unit, in accordance with a judgment result of the video characteristic judgment unit in accordance with a number of motion vector having a count number not smaller than a first threshold count number in a whole histogram, and a judgment result in accordance with a number of motion vector having not smaller than a second threshold count number in a boundary portion of motion detection range of the motion vector detection unit, for switching either the first to third operations for generating a series of frames.

5. A video conversion method for receiving an input video signal including a plurality of frames, generating interpolation frames in accordance with the frames of the input video signal, and converting into a video signal including a part of frame of the plurality of frames included in the input video signal and the interpolation frame, the method comprising steps of:

a step for motion vector detection for detecting a motion vector among the plurality of frames included in the input video signal;

a step for image feature detection for detecting a feature of a video by generating histogram information concerned with the motion vector detected in the step of motion vector detection; and a step of series of interpolation frame generation for generating a series of interpolation frame carrying out: a first interpolation frame generation processing for generating an interpolation frame using the motion vector detected by the step of motion vector detection and the plurality of frames included in the input video signal, a second interpolation frame generation processing for rendering one of frame in the plurality of frames included in the input video signal into an interpolation frame intact, and a third interpolation frame generation processing for rendering a linear interpolation frame of two frames among the plurality of frames included in the input video signal as an interpolation frame to generate the interpolation frame, to generate the series of interpolation frame including a part of frame of the plurality of frames included in the input video signal and the interpolation frame generated from the first to third interpolation frame generation processing; wherein in the step of series of interpolation frame generation, in accordance with a judgment result judged by the step of image feature detection, switching among a first operation for generating a series of frames including the interpolation frame generated in the first interpolation frame generation processing and a part of frame of the plurality of frames included in the input video signal, a second operation for generating a series of frames including the interpolation frame generated in the second interpolation frame generation processing and a part of frame of the plurality of frames included in the input video signal, and a third operation for generating a series of frames including the interpolation frame generated in the first interpolation frame generation processing and a part of frame of the plurality of frames included in the input video signal and the interpolation frame generated in the third interpolation frame generating processing, and in the series of frames generated by the third operation, the interpolation frame generated in the first interpolation frame generating processing is inserted between the frame included in the input video signal and the interpolation frame generated in the third interpolation frame generating processing.

6. A video converting method according to claim 5, wherein the series of interpolation frame generation unit, in accordance with a judgment result of a number of motion vectors having a count number not smaller than a first threshold count number in a whole histogram and a judgment result in accordance with a number of motion vectors having not smaller than a second threshold count number in a boundary portion of motion detection range of the motion vector detection unit, for switching either the first to third operations for generating a series of frames.

* * * * *